United States Patent Office.

GUILLIAM H. CLAMER, OF PHILADELPHIA, PENNSYLVANIA.

METHOD OF ELIMINATING METALS FROM MIXTURES OF METALS.

SPECIFICATION forming part of Letters Patent No. 707,551, dated August 26, 1902.

Application filed January 15, 1902. Serial No. 89,866. (No specimens.)

*To all whom it may concern:*

Be it known that I, GUILLIAM H. CLAMER, a citizen of the United States, residing at Philadelphia, in the county of Philadelphia and State of Pennsylvania, have invented a certain new and useful Method of Eliminating Metals from Mixtures of Metals, of which the following is a specification.

Brass-scrap exists in large quantities and is used in the arts, and it is a mixture of essentially copper, tin, lead, and zinc, with perhaps small percentages of iron, aluminium, and manganese. Furthermore, cheap car-bearings, which constitute quite a source for scrap brass, contain zinc. The proportions of the metals mentioned as existing in the scrap are to a large extent not well known; but the greater percentage consists of copper, and many of the other metals that are present prevent the use of the copper that is present in the most advantageous way. The average composition of low-priced scrap railway-bearings is about as follows: Copper, seventy per cent.; zinc, ten per cent.; lead, fourteen per cent.; tin, six per cent. It is known that an admixture of zinc in a car-bearing greatly increases the rate of wear when associated with copper, tin, and lead in a bearing, and consequently zinc when present in copper-scrap which is intended to be used as car-bearings renders the scrap objectionable. Furthermore, in car-bearings aluminium, manganese, and iron, as well as zinc, are objectionable, so that scrap containing them is undesirable, because their presence tends to cause imperfect castings, and for other reasons well understood. This illustration drawn from the use of scrap in respect to its employment in the manufacture of railway-bearings containing copper serves to show that in many arts such scrap as is available cannot well be used because of the presence in it of one or more metals that are undesirable in the finished article, and in many instances it is at present so expensive to remove the undesirable metals from the scrap that the use of the latter is to a large extent precluded.

It is the object of the present invention to provide a comparatively inexpensive and reliable method for removing such objectionable metals from, for example, copper alloys, and thereby to make such scrap useful in the manufacture of, for example, railway-bearings.

To these and other ends hereinafter set forth the invention, stated in general terms, comprises the method which consists in melting the scrap or alloy in contact with an oxid, sulfid, or chlorid of a metal whose heat of formation is less than that of the metal or metals desired to be eliminated in a suitable flux, whereby the metallic base of the oxid, chlorid, or sulfid is replaced by the metal or metals of the alloy and the reduced metal enters into the alloy.

For the sake of a further description of the invention it will be assumed that the scrap or alloy contains copper, tin, and zinc, which is a common form of scrap, and, further, that it is desirable to eliminate the zinc from it and to replace the zinc in it by lead, which would result in an alloy containing copper, tin, and lead. This last alloy, which contains lead, is useful in the manufacture of railway-bearings and other articles, whereas the alloy which contained zinc would not be useful for such purposes. The substitution of lead for zinc above referred to can be effected in accordance with my invention in the following manner: The alloy of copper, tin, and zinc is heated in contact with oxid of lead, which is held in solution by a suitable flux, as silica and lime or silica and soda-ash. The heat of formation of the lead compound is less than that of zinc, or, in other words, lead is electronegative in respect to zinc. The result of this is that the zinc replaces the lead, forming oxid of zinc, which remains in the slag, and the lead which is reduced from the oxid is taken up by the copper and tin and becomes a part of the new alloy. The proportions in which the oxid of lead is used is determined by reference to its valency. From the foregoing example it is apparent that to eliminate a metal from an alloy or from scrap and replace it by another metal it is necessary that the scrap or alloy should be melted along with a suitable flux containing, also melted, an oxid, sulfid, or chlorid, or equivalent, of a metal which is electronegative in respect to or the heat of formation of which is less than the metal which is to be eliminated. In all cases the well-known law of valency controls the proportions. By using sufficient of the electronegative metallic compound to satisfy the valency of the most electropositive metal or metals of the alloy it is possible to eliminate one or more of them, as desired.

It will be obvious to those skilled in the art to which the invention relates that modifications may be made in details without departing from the spirit thereof; but,

Having thus described the nature and objects of the invention, what I claim as new, and desire to secure by Letters Patent, is—

1. The method of eliminating and replacing part of an alloy, which consists in fusing the alloy and a flux and a chemical metallic compound of which the base is to replace the part to be eliminated and of which the heat of formation is less than that of the part to be eliminated, whereby the chemical compound is reduced and its base enters the alloy and whereby the part to be eliminated enters into the chemical compound and is taken up by the slag, substantially as described.

2. The method of eliminating zinc from alloys of copper containing zinc and replacing it by lead, which consists in heating the alloy in contact with oxid of lead held in solution by a flux, whereby the zinc reduces the oxid of lead to metallic lead which enters the alloy forming an alloy of copper containing lead and whereby the zinc enters the slag in solution as zinc oxid, substantially as described.

3. The method of eliminating and replacing part of a copper alloy, which consists in fusing the alloy and a flux and a chemical metallic compound of which the base is to replace the part to be eliminated and of which the heat of formation is less than that of the part to be eliminated, whereby the chemical compound is reduced and its base enters the alloy, and whereby the part to be eliminated enters into the chemical compound and is taken up by the slag, substantially as described.

In testimony whereof I have hereunto signed my name.

GUILLIAM H. CLAMER.

In presence of—
N. F. NICKELSON,
CECIL BRIGHTBILL.